United States Patent [19]

Ogawa et al.

[11] 4,321,446
[45] Mar. 23, 1982

[54] APPARATUS FOR PRODUCTION OF GRAPHITE FIBERS

[75] Inventors: Hiroyasu Ogawa; Kazuo Nonaka; Hiroto Noda, all of Shizuoka, Japan

[73] Assignee: Toho Beslon Co., Ltd., Tokyo, Japan

[21] Appl. No.: 180,181

[22] Filed: Aug. 21, 1980

[30] Foreign Application Priority Data

Aug. 21, 1979 [JP] Japan .................................. 54-106505

[51] Int. Cl.³ .......................... H05B 6/26; D01F 9/12
[52] U.S. Cl. ...................... 219/10.49 R; 219/10.61 R; 219/10.67; 13/27; 13/35; 423/447.1; 423/448
[58] Field of Search ...................... 219/10.49 R, 10.51, 219/10.61 R, 10.67, 10.69, 10.75, 10.73; 13/27, 26, 35; 423/447.1–447.9, 448

[56] References Cited

U.S. PATENT DOCUMENTS

| | | |
|---|---|---|
| 3,350,494 | 10/1967 | Kunitsky et al. ........ 219/10.49 R X |
| 3,361,864 | 1/1968 | Vollmer et al. ......................... 13/27 |
| 3,772,429 | 11/1973 | Basche et al. .................... 423/447.7 |
| 3,900,540 | 8/1975 | Robba et al. ................. 423/447.3 X |
| 3,927,157 | 12/1975 | Vasterling ........................ 423/447.9 |

Primary Examiner—B. A. Reynolds
Assistant Examiner—Philip H. Leung
Attorney, Agent, or Firm—Sughrue, Mion, Zinn, Macpeak & Seas

[57] ABSTRACT

A vertical heating apparatus for production of graphite fibers from preoxidized fibers or carbon fibers comprises of a tubular heating element which generates heat by high frequency induction. A heat-insulating material layer surrounds the tubular heating element coaxially. The layer is composed of carbon particles having specific grain diameters and angles of repose. A high frequency induction unit is provided around the heat-insulating material layer also in a coaxial relation thereof.

7 Claims, 5 Drawing Figures

APPARATUS FOR PRODUCTION OF GRAPHITE FIBERS

BACKGROUND OF THE INVENTION

1. Field of the Invention

This invention relates to an apparatus for the production of graphite fibers from preoxidized fibers or carbon fibers and more particularly to a heating apparatus which permits the production of graphite fibers having stable quality from preoxidized fibers or carbon fibers continuously for a long period of time.

2. Description of the Prior Art

As is known in the art, a high frequency induction heating apparatus can be used in producing graphite fibers by heating preoxidized fibers or carbon fibers, particularly pre-oxidized fibers or carbon fibers derived from polyacrylonitrile fibers, in an inert gas atmosphere at a temperature of 2000° C. or more.

In such a high frequency induction heating apparatus, high temperatures of 2,000° C. or more, particularly 2,500° C. or more can easily be produced in a short time by use of an oscillator for high frequency induction heating, and the temperature of a heating element can be stabilized by controlling the variation of high frequency output to ±0.1% relative to a ±10% variation of the power voltage, by using an electric control circuit.

However, a change in the quantity of emitted heat in such a heating apparatus, particularly an increase in the quantity of emitted heat which results from deterioration of an insulating material due to high temperatures, cannot be prevented. This leads to instability in the temperature in the heating apparatus, and often to a decrease or to variations in the quality of the graphite fibers formed.

As heat-insulating materials for use in a high temperature furnace in which the temperature is 1,000° C. to 3,000° C., carbon fiber felts, graphite powders, powdery carbon black, etc. have hitherto been employed, including graphite powders having average diameters in the range of from 20 to 50$\mu$ and powdery carbon black having average diameters in the range of 20 to 500 m$\mu$ are known.

The "average diameter" of a grain is measured using a photomicroscope or a scanning electron microscope. The average of the shortest diameter and longest diameter of each grain is obtained and is defined as the diameter of a grain. In such a manner, the diameters of 100 particles are measured and the average diameter is obtained therefrom.

These conventional heat-insulating materials, however, when used in a heating apparatus of the high frequency induction system type, suffer from disadvantages as described below.

Where a heat-insulating material of graphite powder is used in the high frequency induction type heating apparatus, it is easily induced by the high frequency oscillation, and acts not only as a heat-insulating material, but also as part of a heating element. Therefore, its effect as a heat-insulating material is reduced, and it is necessary to increase the thickness of the heat-insulating material layer. Moreover, at high temperatures of 2,000° C. or more, the graphite powder is subject to deterioration in quality, reduction in electric resistance due to an increase in the degree of crystallinity, etc., and the quantity of heat generated by high frequency changes with a lapse of time, resulting in a variation in the temperature of the heating apparatus.

On the other hand, powdery carbon black is not induced by a magnetic field which is produced by high frequency oscillations, as is the case with the heat-insulating material of graphite powder, because it has a very fine particle having a average diameter in the range of from 20 to 500 m$\mu$, and it therefore exhibits a capability to act as a heat-insulating material. However, at high temperatures of 2,000° C. or more, there occurs deterioration of the carbon, reduction in the volume of carbon (which is caused by graphitization), and the formation of voids in the carbon black layer (which is caused by the decomposition and dissipation of organic substances in the carbon black and the expansion and shrinkage of atmospheric gas). Therefore, the quantity of emitted heat increases, resulting in a drop in the temperature in the heating apparatus.

Increasing the output of the oscillator to compensate for the increase in the quantity of emitted heat (that is, in order to raise the temperature) is subjected to limitations and, moreover, gives rise to the problem that the temperature of the outer wall (comprising a glass material) of the heating apparatus may exceed the maximum that it is capable of withstanding.

Therefore, periodic recharging of the heat-insulating material has been required in order to prevent such an increase in the quantity of emitted heat, making it difficult to maintain the operation of such apparatus continuously for a long period of time. Furthermore, since the temperature in the heating apparatus are very high, it is necessary to use as an atmospheric gas, an inert gas, particularly argon, which is very expensive, and it has therefore been desired to employ an apparatus structure which permits a reduction in the amount of the argon used to as low a level as possible.

SUMMARY OF THE INVENTION

An object of this invention is to provide a heating apparatus for the production of graphite fibers from pre-oxidized fibers or carbon fibers in which temperature is maintained constant and which can be used continuously for a long period of time.

Another object of this invention is to provide an apparatus which permits the production of graphite fibers having stabilized high quality continuously for long periods of time by heating preoxidized fibers or carbon fibers.

This invention, therefore, provides a vertical heating apparatus comprising:

a tubular heating element which generates heat by high frequency induction;

a heat-insulating material layer provided around the tubular heating element in coaxial relation thereto, said heat-insulating material layer being composed of carbon particles having an average grain diameter of from about 0.5 to 1.5 mm and an angle of repose of 35° or less, said particles being obtained by granulating carbon black powder having an average grain diameter of from about 50 to 300 m$\mu$ with a carbonizable binder and carbonizing the binder; and a high frequency induction unit provided around the heat-insulating material layer in coaxial relation thereto;

said tubular heating element being provided at the upper end thereof with a fiber introduction inlet and a gas discharge opening and at the lower end thereof with a fiber withdrawal outlet and an inert gas introduction inlet.

In another aspect of this invention, there is provided an apparatus for production of graphite fibers said apparatus comprising:

a vertical heating apparatus as described above and a seal attachment which is connected to the heating apparatus and which comprises: (i) a seal tube having an upper opening by which fibers from the fiber withdrawal outlet of the tubular heating element can be introduced into the seal tube, and through which an inert gas can be supplied into the tubular heating element from the seal tube, an inert gas introduction inlet provided therein in the vicinity of the upper open end, a lower open end through which fiber is withdrawn; and an inert gas output provided therein in the vicinity of the lower open end through which outlet the inert gas is discharged, and (ii) a container containing a sealing liquid in which the lower open end of the seal tube is inserted and disposed so that the inert gas outlet is positioned at the sealing liquid surface.

DETAILED DESCRIPTION OF THE INVENTION

Figure 1:
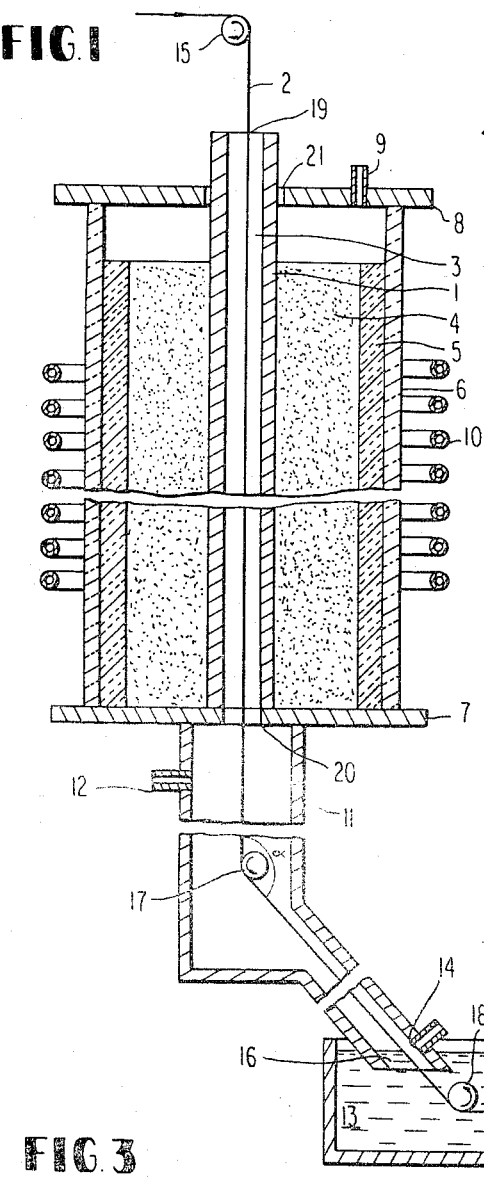
FIG. 1 is a schematic cross sectional view of an embodiment of the apparatus for production of graphite fibers according to this invention.

Carbon particles which are used as insulating material for the heating apparatus of this invention are comprised of carbon black powder assembly; they are obtained by granulating the carbon black powder by use of a carbonizable binder, and heating the resulting granules to carbonize the binder in an inert atmosphere.

Carbon black powders having grain diameters of about 50 m$\mu$ or less, aggregate, result in the formation of carbon particles having low heat-insulating properties. Carbon black powders having grain diameters of about 300 m$\mu$ or more are easily induced and heated by the magnetic field produced by high frequency, leading to a reduction in the effect as a heat-insulating material. Therefore, the carbon black powder for use in the production of the carbon particle has a grain diameter of from about 50 to 300 m$\mu$, and preferably from about 80 to 200 m$\mu$.

Binders which can be used in the production of carbon particles include carbonizable thermosetting resins such as phenol resins, epoxy resins, furan resins, etc., and tar pitch. The amount of the binder used is generally from about 0.5% to 30% by weight, based upon the total weight in dry state; that is, the binder is added in such an amount that after the carbonizing the carbonized binder constitutes about 0.1% by weight to 10% by weight, and preferably from about 0.3% to 3% by weight of the total weight. Where the binder is used in lesser amounts than about 0.1% by weight, difficulties may be encountered in granulating the carbon black powder. On the other hand, in amounts greater than about 10% by weight, the effect as a heat-insulating material of the obtained carbon particle is reduced.

For the granulation of carbon black powder to provide carbon particles, generally known methods can be employed. For example, a solvent can be added to a binder in such an amount that the thus-obtained product is able to be formed into granules. Any solvent which can evaporate on drying of the granules may be used. Carbon black is dispersed into the thus-obtained product, which can be extruded using a nozzle having openings having a diameter of from about 0.5 to 1.5 mm. When the extruded product does not inherently form granules, the extruded product can be cut to obtain granules having an average diameter of from about 0.5 to 1.5 mm. Alternatively, carbon black can be extruded using a nozzle to obtain fine aggregates of the carbon black, and the thus obtained aggregate are immersed with a binder solution and dried. The thus-obtained granules are heated at a temperature of 500° C. or more in an inert atmosphere, e.g., nitrogen gas, to carbonize the binder and provide carbon particles having grain diameters falling in the range of from about 0.01 to 5 mm and an average grain diameter of from about 0.5 to 1.5 mm.

The heating temperature is, as described above, 500° C. or more. At lower temperatures than 500° C., the volume of the carbon particle obtained greatly changes by heating, when it is used as a heat-insulating material in the heating apparatus. The preferred heating temperature is from 1,000° C. to 1,500° C. Higher temperatures cause graphitization, e.g., about 2,000° C. or more (for example, 3,500° C.) but lower than the temperature at which the carbon begins to sublimate under the normal pressure can also be employed. Carbon particles which are used at a high temperature, for example, at about 3,000° C. in the heating apparatus, carbon particles of the present invention may be treated at a high temperature as described above, although it is not necessary. For carbon particles which are to be used as a lower temperature, for example, at less than about 2,000° C., the particles are preferably not treated at more than about 1,500° C. in view of their heat-insulating property.

This heating carbonizes the binder while at the same time providing carbon particles having a surface of appropriate lubricity and an angle of repose of 35° or less. In general, the heating time is about 10 to 100 minutes and preferably about 20 to 40 minutes.

A predetermined angle of repose can be achieved by experimentarily controlling, for example, the temperature, or the time of carbonization, when other conditions are predetermined and they fall within the range of the present invention. Usually, the angle of repose decreases as the temperature of carbonization increases.

Figure 4:
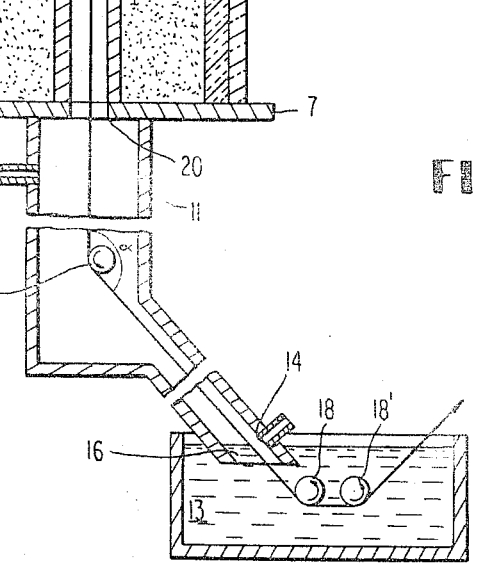
FIG. 4 illustrates a method for determining an angle of repose.
Figure 4:
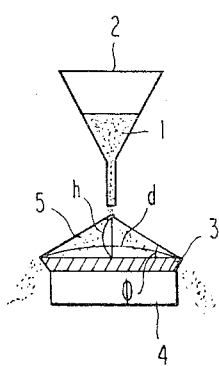

The method for measurement of the angle of repose of carbon particles used in the present invention is explained hereinbelow, referring to FIG. 4. Carbon particles 1 are allowed to fall freely, through a funnel 2 with an outlet having a diameter of 8 mm, to the center of a dish 3 having a depth of 1 cm, a diameter of the base of 20 cm and a diameter (d) of the upper edge of the dish of 22 cm.

The dish is preferably placed on a stand 4 having a height, for example, of about 5 cm. During falling of the carbon particles, the lower edge of the outlet of the funnel is maintained at a height of 5 mm from the top of the cone 5 formed by accumulation of the carbon particles in the dish. The flow of carbon particles is stopped when the particles begin to overflow the dish. The height (h) of the accumulated particles are measured and from the following equation the angle of repose ($\phi$) is obtained.

$$\phi = \text{arc tan } 2h/d$$

Where carbon particles having average grain diameters falling outside the range of about 0.5 to 1.5 mm and angles of repose of more than 35°, voids are formed in the heat-insulating material layer when the heating apparatus is operated continuously for long period of time, and the heat-insulating effect of the layer decreases.

On the other hand, where carbon particles having the grain diameters and angles of repose as specified above are employed as a heat-insulating material, even if the heating apparatus is operated continuously for long periods of time, voids are always naturally filled or removed and no change in the temperature retention properties of the heat-insulating material layer is caused. As a result, the heating apparatus can be stably operated while maintaining the temperature therein as a constant level for long periods of time.

Preferred grain diameters of the particles are from about 0.8 to 1.3 mm and preferred angles of repose are 33° or less. The minimum angle of repose which can be produced or is available is generally about 28°.

It is preferable to control the ratio of the bulk density of the particles to the density of the particles per se to within the range of from 0.01/1 to 0.90/1, and more preferably from 0.08/1 to 0.85/1. When the ratio falls within the range of from 0.01/1 to 0.90/1, the carbon particles provide an excellent heat-insulating property. Viz., the content of carbon in a particle is preferred to be controlled to avoid to be so large that the carbon in a particle aggregate into one body, or to be so small that a considerable number of voids form in the particle. Such phenomena decrease the heat-insulating property.

Control of the ratio can be carried out by experimentarily varying the ratio of the carbon black powder to the binder, the kind of binder, or increasing the density of the particle by penetrating the particle with a solution of the resin binder or with tar pitch in a liquid state and carbonizing the penetrated material.

The bulk density of the carbon particles is measured as follows:

Carbon particles are placed in a 200 ml measuring cylinder, the wall of the messcylinder is patted, and more particles added until the volume of particles in the messcylinder does not decrease any more. The weight (Wg) of 200 ml of carbon particles in the messcylinder is measured and the bulk density (Wg/200 ml) is thus obtained.

When a sealing attachment is attached to the graphite fiber withdrawal outlet of the heating apparatus so that only the inert gas is introduced from the graphite fiber withdrawal outlet into the heating apparatus, graphite fibers can be produced which have high tensile modulus and strength.

The seal tube is tightly connected to the heating apparatus and an inert gas is introduced into the seal tube through the inert gas introduction inlet which is provided in the seal tube at an upper portion thereof. Through the other open end of the seal tube the graphite fibers are withdrawn.

As a sealing liquid which is placed in the sealing equipment, compounds are used which have a low vapor pressure and exert no adverse influences on the fibers; for example, hydrocarbons such as benzene and hexane, and organic chlorides such as dichloroethane and carbon tetrachloride can be used.

The inert gas outlet is provided in the seal tube at such a portion that the inert gas can sweep any evaporated gas from the sealing liquid and exhaust it from the tube. Such portion in the tube is the vicinity of the lower end thereof. When the seal tube is inserted or placed in the sealing liquid so that the outlet is positioned on the sealing liquid surface part of the inert gas introduced through the inert gas introduction inlet flows downward in the seal tube and then over the sealing liquid, and it is then withdrawn through the inert gas outlet. This is effective in preventing the evaporated sealing liquid from diffusing to the heating apparatus, and in preventing gases dissolved in the sealing liquid from evaporating and diffusing to the heating apparatus.

A heating apparatus of this invention will be explained in futher detail by reference to the drawings.

FIG. 1 is a schematic cross sectional view of an embodiment of a heating apparatus according to the invention wherein the reference numeral 1 indicates a tubular heating element which generates heat by high frequency induction and which includes a cylindrical hole 3 through which a fiber to be treated, i.e., a preoxidized fiber or carbon fiber 2 passes. As such a heating element, generally, carbon (including graphite) is used. The cylindrical hole 3 has a fiber introduction inlet 19 at upper portion thereof and a fiber withdrawal outlet 20 at the lower portion thereof. In this embodiment the fiber withdrawal outlet 20 and the fiber introduction inlet 19 serve simultaneously as an inert gas introduction inlet and a gas discharge opening, respectively. In such an embodiment the undesirable introduction of air into the cylindrical hole 3 accompanying the introduction of the fiber through the inlet 19 can be completely prevented.

The heating element 1 is enveloped in heat-insulating materials 4 and 5, disposed vertically in the center of a heat resistant material tube 6, and secured to a base plate 7 and a cover plate 8.

As a heat resistant material for use in the production of the outer tube 6, glassy material such as silica glass, quarty glass and hard glass, and materials having good hermetic sealing properties and electrically insulating properties, such as pottery and porcelain, can be used.

For the heat-insulating material 4, carbon particles of this invention are used, and the heat-insulating material 5 is, for example, a felt-like material made of alumina silica.

The heat-insulating material 5 is used in order to minimize the structure of the heating apparatus, particularly the heat-insulating layer, but it is not always required to be provided.

When a carbon fiber felt is used as a heat-insulating material, the thickness of the carbon fiber felt layer may typically be from about 10 to 15 mm, and the carbon particle layer of this invention may be provided around the carbon fiber felt layer since the carbon fiber felt is easily induced by high frequency.

The heat-insulating material layers 4 and 5 in the heat resistant material tube 6 is in the atmosphere of an inert gas, such as argon, helium, nitrogen or the like, and they are hermetically sealed by packings. The top plate 8 is provided with a gas inlet 9 and a gas outlet 21.

Around the heat resistant material tube 6 is provided a high frequency oscillation coil 10.

A seal tube 11 is hermetically connected to the base plate 7 of the heating apparatus. The seal tube 11 is provided with an inert gas introduction inlet 12 at an upper portion thereof, and the lower end of the seal tube 11 is inserted or disposed in a sealing liquid 13. At a lower portion, the seal tube 11 is provided with an inert gas outlet 14 which is located on the sealing liquid surface.

The position of the inert gas outlet 14 is, as described above, of importance: that is, in order to prevent the evaporated sealing liquid from going into the cylindrical hole 3, the inert gas outlet 14 is desirably positioned so that part of the gas introduced through the gas inlet 12 flows over the sealing liquid 13 and is withdrawn together with evaporated sealing liquid from the gas outlet 14.

Figure 2A:
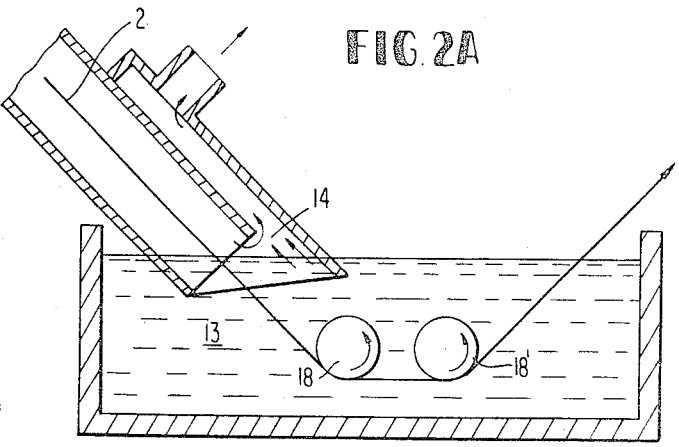
FIG. 2a is a cross sectional view of an embodiment of the sealing equipment of the present invention which is connected to a heating apparatus of the present invention.
Figure 2B:
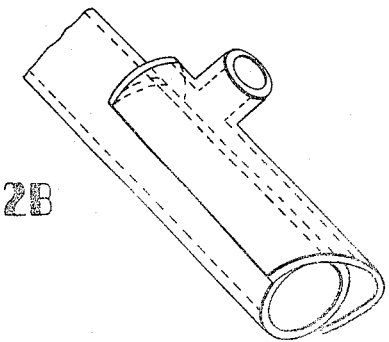
FIG. 2b is a perspective view of the sealing tube of the seal attachment.

A seal tube having the structure as illustrated in FIG. 2a and FIG. 2b can be effectively used. In this seal tube, the side wall is provided at a lower portion thereof with a notch or an opening which allows the inert gas to be withdrawn, and around the tube wall at this lower portion, a hermetically sealed tube wall which insulates the notch or opening from the air dipped in the sealing liquid is provided, and a gas outlet is provided on the tube wall. Thus, the gas is withdrawn from the seal tube along the sealing liquid through the notch or opening at the side wall.

In a seal tube as used in this invention, it is preferred to dispose the lower open end of the seal tube so that it is positioned outside the extension line of the inner tube wall of the heating element, as illustrated in FIG. 1, in order to prevent the radiant heat from the heating element from being projected onto the sealing liquid.

In FIG. 1, the seal tube 11 is bent so that the sealing liquid 13 is not positioned just below the tubular heating element 1 of the heating apparatus. Disposing the lower open end of the seal tube so that the radiant heat from the heating element is not directly projected on the sealing liquid is effective in preventing the temperature of the sealing liquid from becoming too high, thereby the evaporation of the sealing liquid and entering of the evaporated sealing liquid into the cylindrical hole 3 are prevented. However, if the tube is bent too much and the fibers which pass through this tube are bent too much, they tend to be broken at the bending portion of the tube that is, at roller 17 in FIG. 1. Therefor, the angle $\alpha$ which is formed by fibers at the bending portion is preferable to be at least about 120°, more preferably from about 120° to 150°, and usually, is preferred to be less than 175°. Furthermore, it is preferred to use a roller 17 having a diameter of at least 10 mm.

The fiber 2 is introduced by a supply roller 15 into the heating element where it is subjected to graphitization and continuously transferred, and it is then introduced into the sealing liquid 13 through the lower open end 16 of the seal tube 11 and withdrawn through a roll 18 and 18'.

By connecting the seal tube as described above to the heating apparatus of this invention, the amount of the inert gas required to be supplied can be reduced. Moreover, since the seal tube is designed so that the evaporated sealing liquid is prevented from entering into the heating apparatus, it is possible to produce high quality graphite fibers by use of this heating apparatus.

Figure 3:
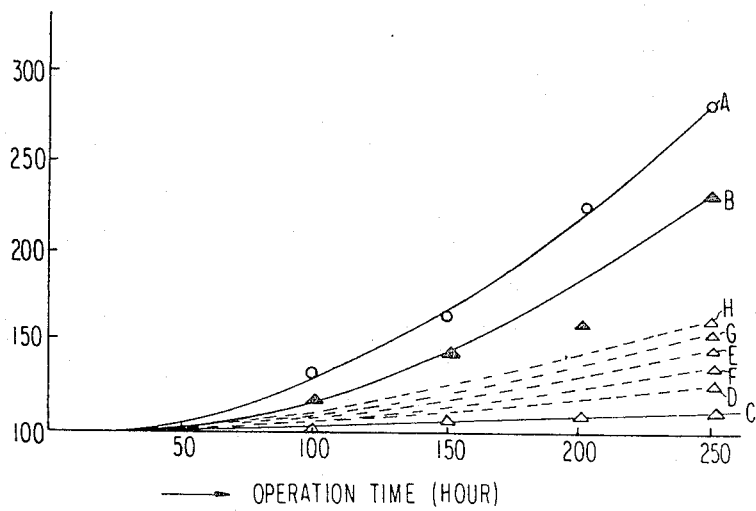
FIG. 3 is a graph showing the relation between the change in the output of an oscillator necessary in order to maintain the temperature at a constant level and the operation period, using insulating materials having different grain diameters of carbon black powder and carbon particles, and different angles of repose of the particles are employed.

The effect of the carbon particles which are used in the heat-insulating material layer of the present heating apparatus is shown in FIG. 3.

FIG. 3 shows changes in oscillation output when the heating apparatus as illustrated in FIG. 1 was continuously operated for 250 hours while adjusting the output of the high frequency oscillator in order to maintain the temperature in the heating apparatus at 2,850° C. These changes are indicated in percentage based upon the oscillation output at which the temperature reached 2,850° C. and the operation was stabilized.

A mixture having the composition shown in Table 1, was produced by dispersing carbon black powder into a solution of a phenol resin in methanol. The mixture was extruded downward vertically from a nozzle with holes having a diameter of 0.75 mm. The extruded mixture broke into lengthes of about 1 mm to form granules. The thus-obtained granules were dried at 100° C. and then heat treated at 200° C. for 30 minutes in the air. The carbonization was carried out at 800° C. for 30 minutes, at 1,000° C. for 30 minutes, and then at 1,500° C. for 30 minutes in nitrogen gas. Characteristics of the thus-obtained carbon particles are also shown in Table 1.

TABLE 1

| | Sample No. | A | B[2] | C | D | E[3] | F | G | H |
|---|---|---|---|---|---|---|---|---|---|
| Composition of solution | Phenol Resin (PBW)[1] | 1 | 10 | 10 | 5 | 1 | 40 | 0.1 | 45 |
| | Methanol (PBW)[1] | 99 | 90 | 90 | 95 | 99 | 60 | 99.9 | 55 |
| Amount of the solution (PBW)[1] | | 15 | 15 | 15 | 15 | 15 | 30 | 15 | 30 |
| Average Grain Diameter of Carbon Black (or Graphite) | | $50_{m\mu}$ | $20_\mu$ | $50_{m\mu}$ | $0.8_\mu$ | $50_{m\mu}$ | $50_{m\mu}$ | $50_{m\mu}$ | $50_{m\mu}$ |
| Amount of Carbon Black (or Graphite) (PBW)[1] | | 100 | 100 | 100 | 100 | 100 | 100 | 100 | 100 |
| Characteristics of carbon particles | Angle of Repose (°) | 48 | 29 | 29 | 29 | 29 | 29 | 29 | 29 |
| | Average Grain Diameter (mm) | 0.7 | 0.7 | 0.7 | 0.7 | 0.7 | 0.7 | 0.7 | 0.7 |
| | Bulk Density | 0.08 | 0.90 | 0.25 | 0.25 | 0.08 | 0.85 | 0.008 | 0.92 |

TABLE 1-continued

| Sample No. | A | B[2] | C | D | E[3] | F | G | H |
|---|---|---|---|---|---|---|---|---|
| Density | | | | | | | | |

Note:
[1]PBW refers to parts by weight.
[2]Graphite was used in Sample B instead of carbon black powder.
[3]Sample E was obtained by heat-treating Sample A at 2,500° C. for 30 minutes.

FIG. 3 clearly indicates that the layer composed of carbon particles having an average grain diameter of 300 mμ or less and an angle of repose of 35° or less exhibits stable temperature-retention state (Samples C–H). Furthermore, FIG. 3 indicates that when the layer composed of carbon particles having the ratio of the bulk density of carbon particles to the density of carbon particles falls within the range of 0.01 to 0.90 (Samples C–F) particularly excellent results are obtained.

Preoxidized fibers or carbon fibers for use in the production of graphite fibers are derived from rayons, pitch, acrylonitrile based polymers and other organic fibers. For the production of high quality graphite fibers having a high modulus of elasticity and strength, acrylonitrile based polymer fibers, for example, those fibers which are obtained by treating for 0.1 to 10 hours under limited shrinkage in an oxidizing atmosphere at 200° to 300° C. as taught in Japanese Patent Publication No. 39100/1977 corresponding to U.S. Pat. No. 4,069,297, and carbon fibers obtained by treating such preoxidized fibers in an inert gas atmosphere at a temperature of from 600° to 1,500° C. for from 0.1 to 10 minutes are preferably used. The carbon content and the increase of the bonded oxygen content of the thus-obtained preoxidized fiber are from about 55 to 65% and 5 to 25% (preferably 8 to 15%) of the weight of the fiber, respectively. The carbon content and the bonded oxygen content of the thus-obtained carbon fiber are more than about 70%, and from about 0 to 5% of the weight of the fiber, respectively.

The term "acrylonitrile based polymer" as herein used means a polymer or copolymer containing about 90% by weight of acrylonitrile. As a copolymerization component, vinyl monomers which are usually used for copolymerization of acrylonitrile, such as acrylic acid, methacrylic acid or their esters, acrolein, acrylamide, etc. can be used.

The thus-obtained preoxidized fiber or carbon fiber is introduced through the fiber introduction inlet into the heating apparatus heated at from about 2,000° C. to 3,500° C., usually as a bundle of the fibers, where it is treated for about 0.1 to 10 minutes. The inlet gas, for example, argon, nitrogen or a mixture thereof, is supplied through the fiber withdrawal outlet. The inert gas flows upward, i.e., counter-currently with the fiber, and is withdrawn from the top open end. The amount of the inert gas being supplied into the seal tube is generally about 1 to 100 liter/minute. Usually, it is preferable that about 5 to 20% of the gas supplied is exhausted from the outlet provided at the lower portion of the sealing tube, and the remaining portion is supplied to the heating apparatus.

EXAMPLE 1

In this example, an apparatus as illustrated in FIG. 1 was employed:

The heating element 1 is a tube with an inner diameter of 50 mm, an outer diameter of 70 mm and a length of 2,200 mm which was made up of graphite;

100 Parts by weight of carbon black powder having an average grain diameter of 50 mμ was dispersed into 15 parts by weight of a solution comprising 10 parts by weight of a phenol resin and 90 parts by weight of methanol. The thus obtained dispersion was extruded vertically downward from a nozzle having holes with a diameter of 0.85 mm. The extruded product broke into granules. The granules were dired at 100° C., then heat-treated at 180° C. for 3 hours, and heated at 1,000° C. for 30 minutes in nitrogen gas to carbonize the phenol resin. The thus obtained carbon particles had an average grain diameter of 0.8 mm and an angle of repose of 30°. The carbon particles were positioned between the heating element 1 and the heat-insulating material 5 to a height of 1,800 mm;

The heat-insulating material 5 was a felt made up of alumina silica and had a thickness of 25 mm and a height of 1,800 mm;

The outer tube 6 was a quartz glass tube having an inner diameter of 260 mm and an outer diameter of 270 mm; and The high frequency (100 KHz) induction coil 10 was a copper pipe having an inner diameter of 10 mm and an outer diameter of 15 mm through which cooling water was passed, wound around the outer tube 6 spirally 13 times, and connected to a 40 KW oscillator.

The seal tube 11 comprised an iron main tube having an inner diameter of 140 mm and an outer diameter of 160 mm, and an iron tube having an inner diameter of 50 mm and an outer diameter of 70 mm which extended from the iron main tube at an angle (α) of 135°. The diameters of the inert gas inlet and outlet were 20 mm each. The distance between the base plate 7 to the roller 17 and the height from the roller 17 to the open end 16 of the seal tube were 50 cm each.

The lower open end of the seal tube 11 was inserted or placed in the sealing liquid to a depth of 25 mm, and the distance between the base plate 7 and the sealing liquid level was 1,500 mm.

Ten carbon fiber yarns, each consisting of 6,000 of carbon fibers produced from an acrylonitrile based fiber consisting of 98% by weight of acrylonitrile and 2% by weight of methyl acrylate and having a carbon content of 95% by weight, a tensile strength of 320 Kg/mm², a tensile modulus of 24 ton/mm² and a monofilament diameter of 7μ, were introduced into the heating apparatus as described above. The maximum temperature of the heating element 1 was 2,850° C., and an argon gas and a nitrogen gas were supplied, respectively, through the inlets 12 and 9, at rates of 10 liter/minute and withdrawn at a rate of 2 liter/minute through the outlet 14.

As a result of the operation under the conditions as described above, the high frequency oscillation output at 2,850° C. was 21 KW, and after a lapse of 300 hours, the output remained 22 KW stably. Changes in quality with time of the obtained graphite fibers are shown in the following table. As can be seen from the table, they have high strength and tensile modulus and no appreciable changes in quality can be observed.

TABLE 2

| Time (Hours) | Tensile Strength (Kg/mm$^2$) | Tensile Modulus (ton/mm$^2$) |
|---|---|---|
| 50 | 280 | 37.0 |
| 100 | 283 | 37.1 |
| 200 | 280 | 37.0 |
| 300 | 282 | 37.2 |

While the invention has been described in detail and with reference to specific embodiments thereof, it will be apparent to one skilled in the art that various changes and modifications can be made therein without departing from the spirit and scope thereof.

What is claimed is:

1. A vertical heating apparatus for production of graphite fibers from preoxidized fibers or carbon fibers, said apparatus comprising:
    a tubular heating element which generates heat by high frequency induction;
    a heat-insulating material layer provided around the tubular heating element in coaxial relation thereto, said heat-insulating material layer being composed of carbon particles having an average grain diameter of from about 0.5 to 1.5 mm and an angle of repose of 35° or less, said particles being obtained by granulating carbon black powder having an average grain diameter of from about 50 to 300 m$\mu$ with a carbonizable binder and carbonizing the binder; and
    a high frequency induction unit provided around the heat-insulating material layer in coaxial relation thereto;
    said tubular heating element being provided at an upper portion thereof with a fiber introduction inlet and a gas discharge outlet, and at a lower portion thereof with a fiber withdrawal outlet and an inert gas introduction inlet.

2. A heating apparatus as in claim 1 wherein the fiber withdrawal outlet of the heating apparatus is connected to a seal attachment comprising:
    (i) a seal tube having an upper opening by which fiber from the fiber withdrawal outlet of the tubular heating element can be introduced into the seal tube, an inert gas introduction inlet provided therein in the vicinity of the upper open end for supplying inert gas into the tubular heating element, a lower open end through which the fiber is withdrawn, and an inert gas outlet provided therein in the vicinity of the lower open end through which inert gas is discharged; and
    (ii) a container containing a sealing liquid in which the lower open end of the seal tube is inserted and disposed therein so that the inert gas outlet is positioned at surface of the sealing liquid.

3. A heating apparatus as in claim 2 wherein the seal tube is bent so that the lower open end of the seal tube is located outside the extension line of the inner tube wall of the heating element, in order to prevent the radiant heat from the heating element from being projected on the sealing liquid.

4. A heating apparatus as in claim 3 wherein the seal tube is bent so that the angle formed by the fiber at the bending portion of the seal tube is at least about 120°.

5. A heating apparatus as in claim 4 wherein the angle formed by the fiber is from about 120° to 150°.

6. A heating apparatus as in claim 4 wherein the angle formed by the fiber is less than 175°.

7. A heating apparatus as in claim 1 wherein the ratio of the bulk density of the carbon particles to the density of the carbon particle is from 0.01/1 to 0.90/1.

* * * * *